United States Patent [19]

Miyata et al.

[11] 4,268,056
[45] May 19, 1981

[54] STRUCTURE FOR ATTACHING HITCH TO TRACTOR

[75] Inventors: Junji Miyata, Koaza-Yakimachi; Kazuaki Kurohara, Sakai, both of Japan

[73] Assignee: Kubota, Ltd., Osaka, Japan

[21] Appl. No.: 66,744

[22] Filed: Aug. 15, 1979

[30] Foreign Application Priority Data

Aug. 29, 1978 [JP] Japan .......................... 53-119434[U]

[51] Int. Cl.³ ...................... A01B 59/042; B60D 1/14
[52] U.S. Cl. .................... 280/456 A; 172/47; 172/450; 280/460 A; 280/461 A; 280/446 B
[58] Field of Search .......... 280/456 A, 460 A, 461 A, 280/446 A, 446 B, 415 R, 415 A; 172/47, 439, 450

[56] References Cited

U.S. PATENT DOCUMENTS

| 2,579,553 | 12/1951 | Daniel | 172/459 |
| 3,128,830 | 4/1964 | Doering | 280/460 A |
| 3,708,017 | 1/1973 | Alexandrovsky et al. | 172/439 |
| 3,865,404 | 2/1975 | Schwartz | 280/460 A |
| 4,045,143 | 8/1977 | Gomiero | 280/461 A |

Primary Examiner—Randolph A. Reese
Assistant Examiner—Donn McGiehan
Attorney, Agent, or Firm—Edwin E. Greigg

[57] ABSTRACT

A structure for attaching a hitch to a tractor for detachably connecting a trailing working device to the tractor. A rod for pivotably supporting a pair of opposed lower links for connecting a ground working implement to the tractor pivotally movably up and down is supported by and extends transversely through a transmission case portion. The hitch is supported on the rod.

3 Claims, 4 Drawing Figures

STRUCTURE FOR ATTACHING HITCH TO TRACTOR

BACKGROUND OF THE INVENTION

This invention relates to improvements in a structure for attaching a hitch to a tractor to detachably connect a trailing working device such as a trailer to a rear portion of the tractor.

With conventional tractors, a hitch is fixed as by bolts directly to the bottom of a transmission case portion supporting rear drive wheels by a transmission shaft. A rod for pivotably supporting a pair of lower links is supported by and extends transversely through the hitch. Accordingly the hitch is subjected concentrically to a reaction when a trailing working device is pulled by the hitch. A reaction also acts concentrically on the hitch when a ground working implement is pivotally moved upward or downward by the rod and the pair of lower links. The tractors therefore have the drawback that the hitch and the hitch bearing portion of the transmission case are worn away and damaged early, failing to pull the device and permit the pivotal movement of the implement with stability.

SUMMARY OF THE INVENTION

The main object of this invention is to provide a structure free from the above drawback heretofore experienced, simplified in construction and having a hitch supporting portion of increased strength.

To fulfil this object, the invention provides a hitch attaching structure for a tractor characterized in that a rod for pivotably supporting a pair of opposed lower links for connecting a ground working implement to the tractor pivotally movably up and down is supported by and extends transversely through a transmission case portion, the rod supporting a hitch for detachably connecting a trailing working device.

With this structure, the reaction resulting from the traction of the trailing working device is delivered to the transmission case portion through the hitch and the rod, while the reaction produced when the ground working implement is pivotally moved is also delivered to the transmission case portion through the hitch and the rod. Since the rod is supported directly by the transmission case portion while extending transversely therethrough, the rod can withstand these reactive forces with high strength unlike the conventional structure in which the hitch is merely fixed to the transmission case portion in contact therewith. The hitch and the rod, as well as the transmission case portion, can therefore be prevented from wear and damage over a prolonged period of time. Consequently the use of the rod for supporting both the trailing device and the ground working implement, while affording a simplified construction, assures the traction of the device and pivotal movement of the implement with extreme stability over a long period of time.

Other objects and advantages of the invention will become more apparent from the following description.

DESCRIPTION OF THE PREFERRED EMBODIMENT

Figure 1:
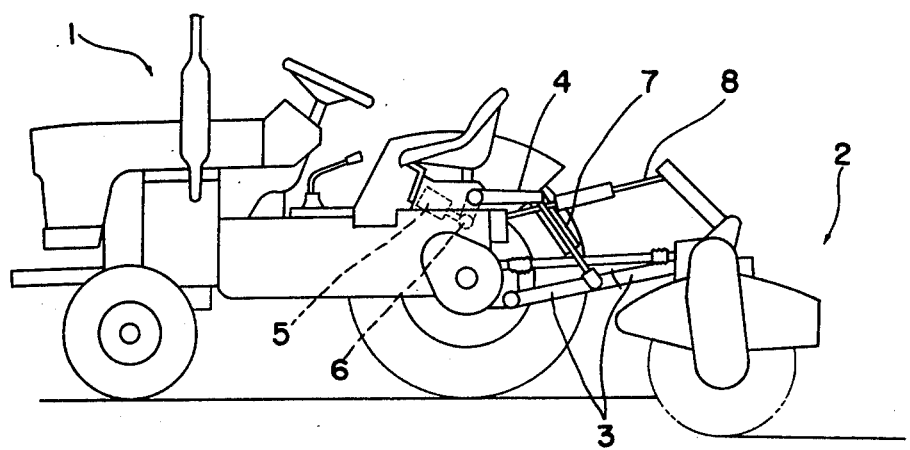
FIG. 1 is a side elevation showing a tractor provided with a hitch attaching structure embodying the invention.

FIG. 1 schematically shows a tractor 1 and a rotary tiller unit 2 serving as a ground working implement and connected to a rear portion of the tractor 1 in operative relation therewith. A pair of opposed lower links 3, 3 extends between and interconnects a lower portion of the tractor 1 and a lower portion of the rotary unit 2. A pair of opposed lift arms 4, 4 are pivoted to an upper portion of the tractor by a cylinder 5 and a common lateral rod 6. The rear ends of the lift arms 4, 4 are pivotably connected to intermediate portions of the lower links 3, 3 by lift rods 7, 7. A top link 8 of the turnbuckle type extends from an upper portion of the tractor 1 to the top portion of the rotary unit 2. The cylinder 5, when contracted or expanded, raises or lowers the arms 4, 4 to pivotally move the rotary unit 2 upward or downward by means of the rods 7, 7 and the lower links 3, 3 and adjust the depth of cultivation. The top link 8, when shortened or stretched, adjusts the inclination of the rotary unit 2.

Figure 2:
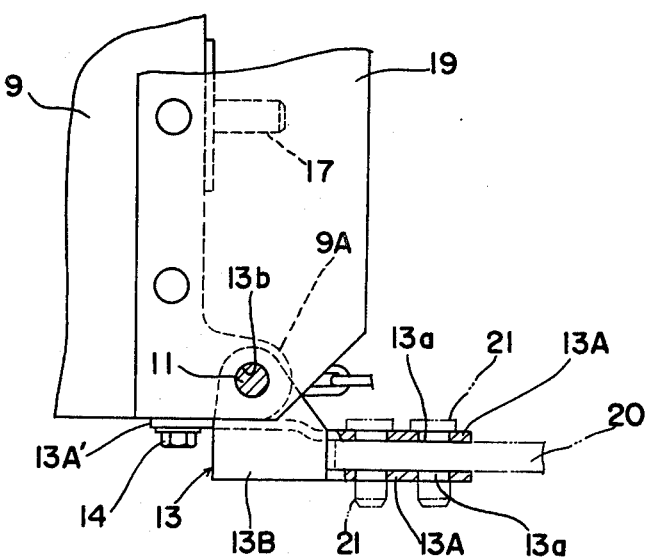
FIG. 2 is a side elevation partly broken away and showing the structure.
Figure 3:
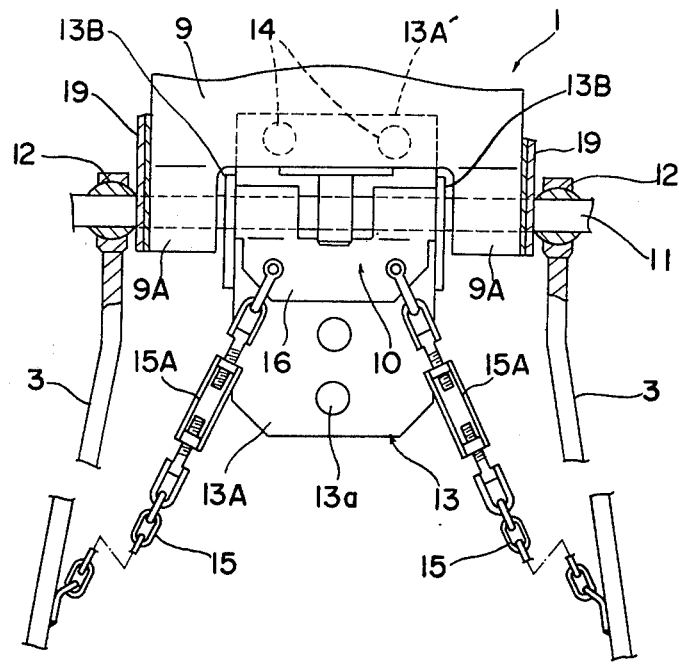
FIG. 3 is a plan view partly broken away and showing the same.
Figure 4:
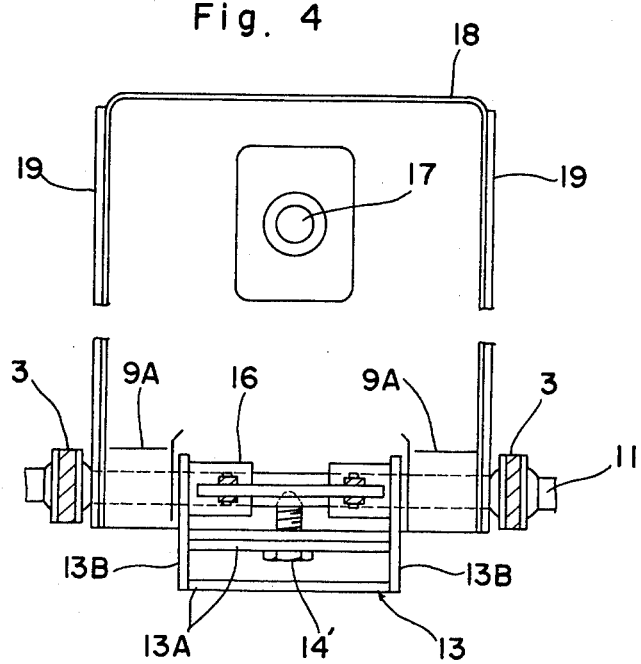
FIG. 4 is a rear view partly broken away and showing the same.

As shown in FIGS. 2 to 4 in greater detail, both the lower links 3, 3 are connected to the rear portion of the tractor 1. A transmission case (differential gear case) portion 9 disposed in the rear portion of the tractor 1 is provided with bosses 9A, 9A projecting rearward from a lower rear part of the portion 9 at its opposite sides. A recess 10 is formed between the bosses 9A, 9A. A rod 11 for pivotably supporting the lower links 3, 3 is supported by and extends through the bosses 9A, 9A transversely of the case portion 9. The rod 11 has opposite projecting ends on which the front ends of the lower links 3, 3 are supported by bearings 12, 12 which are turnable about the rod 11 and angularly shiftable relative to the direction of the rod 11. A hitch 13 comprises opposed upper and lower horizontal plates 13A, 13A and opposite side plates 13B, 13B integral with the plates 13A, 13A. The rod 11 fittingly extends through holes 13b, 13b formed in the side plates 13B, 13B positioned in the recess 10. The upper horizontal plate 13A of the hitch 13 has a forward extension 13A' in contact with the bottom of the transmission case portion 9 to the front of the recess 10 and secured to the bottom by a pair of bolts 14, 14. A bolt 14' bearing against the rod 11 prevents the rod 11 from shifting sidewise relative to the hitch 13. The upper and lower horizontal plates 13A, 13A are formed with pin bores 13a, 13a, .. respectively. When a trailing working device such as a trailer is to be connected to the tractor in place of the rotary unit 2, a front end connecting member 20 of the device is placed between the two plates 13A, 13A and engaged by pins 21, 21, ... passed through the bores 13a, 13a, ... as indicated in phantom lines in FIG. 2, whereby the device can be detachably connected to the tractor 1.

A member (check chain bracket) 16 for attaching the base ends of chains (check chains) 15, 15 for preventing the lower links 3, 3 from sidewise deflection is disposed within the recess 10 and between the hitch side plates 13B, 13B, as fittingly mounted on the rod 11 turnably relative thereto. The chains 15, 15 are connected at their rear ends to intermediate portions of the lower links 3, 3 and each have an intermediate turnbuckle 15A.

A PTO shaft 17 extends rearward from the rear side of the transmission case portion 9 at a location above the recess 10. The PTO shaft 17 is protected by a cover 18 in the form of an inverted channel when seen from the rear and extending between the outer ends of the bosses 9A, 9A. Reinforcing plates 19, 19 are fixedly joined to the opposite sides of the cover 18. Both the cover 18 and the reinforcing plates 19, 19 are fitted to the rod 11.

Since the bosses 9A, 9A, as well as the cover 18 and the reinforcing plates 19, 19, support the rod 11 at its opposite ends, the rod 11 itself can be connected to the tractor 1 with increased strength. Furthermore, the hitch 13 and the attaching member 16, which are fitted to the rod 11 between the bosses 9A, 9A, can be connected to the rod 11 with enhanced strength.

We claim:

1. A hitch attaching structure for a tractor comprising:
   a transmission case on said tractor having a bottom and a lower rear part;
   bosses projecting from opposite sides of said lower rear part of said transmission including inner and outer surfaces;
   a recess formed between the inner surfaces of said bosses.
   a transverse rod supported by apertures in said bosses;
   a pair of opposed lower links pivotally supported by said rod, one link on each end thereof, along the outer surfaces of said bosses;
   a hitch supported by said rod within said recess between said bosses;
   said hitch including spaced parallel horizontal plates and opposed vertical side plates;
   one of said horizontal plates including a forward extension which is secured to the bottom of said transmission;
   each of said opposed side plates including a hole in their forward portion and extending closely along said inner surfaces of said bosses and secured to said horizontal plates;
   said transverse rod extending through said holes in each of said side plates for supporting said hitch;
   whereby said hitch is supported by said transverse rod and said forward extension on one of said horizontal plates.

2. A hitch attaching structure as defined in claim 1, further comprising a bolt mounted on a forward portion of said hitch and having a tip end thereof bearing against said rod to prevent said rod from shifting sidewise.

3. A hitch attaching structure as defined in claim 1, further comprising means mounted on said rod for attaching base ends of chains for preventing sidewise deflections of said lower links.

* * * * *